US009141292B2

(12) United States Patent
Aswadhati et al.

(10) Patent No.: US 9,141,292 B2
(45) Date of Patent: *Sep. 22, 2015

(54) ENHANCED INTERFACE TO FIRMWARE OPERATING IN A SOLID STATE DRIVE

(71) Applicant: Fastor Systems, Inc., Santa Clara, CA (US)

(72) Inventors: Ajoy Aswadhati, Cupertino, CA (US); Vijay Aswadhati, San Ramon, CA (US)

(73) Assignee: SMART High Reliability Solutions LLC, Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/591,887

(22) Filed: Jan. 7, 2015

(65) Prior Publication Data

US 2015/0193146 A1 Jul. 9, 2015

Related U.S. Application Data

(63) Continuation-in-part of application No. 14/147,462, filed on Jan. 3, 2014, now Pat. No. 8,935,463.

(60) Provisional application No. 61/925,188, filed on Jan. 8, 2014.

(51) Int. Cl.
*G06F 13/00* (2006.01)
*G06F 3/06* (2006.01)
*G06F 13/42* (2006.01)

(52) U.S. Cl.
CPC .............. *G06F 3/061* (2013.01); *G06F 3/0655* (2013.01); *G06F 3/0679* (2013.01); *G06F 13/4221* (2013.01); *G06F 2206/1014* (2013.01)

(58) Field of Classification Search
CPC ........ G06F 3/0679; G06F 11/68; G06F 13/00
See application file for complete search history.

(56) References Cited

U.S. PATENT DOCUMENTS

| 2007/0055831 A1 | 3/2007 | Beeston et al. |
| 2011/0055471 A1 | 3/2011 | Thatcher et al. |
| 2012/0260021 A1 | 10/2012 | Rudelic |
| 2013/0067151 A1 | 3/2013 | Lasser et al. |
| 2013/0289756 A1 | 10/2013 | Resch et al. |

*Primary Examiner* — Sean D Rossiter

(57) ABSTRACT

An embodiment of the invention includes a storage subsystem having a storage central processing unit (SCPU) operable to receive and send a command to a host, the command requiring data computation, a compute engine coupled to the SCPU, and a bank of memory devices coupled to the SCPU and the compute engine and configured to store data required by the commands, wherein the SCPU or the compute engine are operable to perform computation of the data and to further invoke an appropriate Flash Translation Layer (FTL) application based on workload.

20 Claims, 4 Drawing Sheets

ENHANCED INTERFACE TO FIRMWARE OPERATING IN A SOLID STATE DRIVE

CROSS-REFERENCE TO RELATED APPLICATION

This application claims priority to U.S. Provisional Application No. 61/925,188, filed on Jan. 8, 2014, by Ajoy Aswadhati and entitled "Enhanced Interface to Firmware Are Operating In A Solid State Drive" and is a continuation-in-part of U.S. patent application Ser. No. 14/147,462, filed on Jan. 3, 2014, by Ajoy Aswadhati et al., and entitled "Compute Offload", disclosure of both of which are incorporated herein by reference.

BACKGROUND

Various embodiment of the invention relate generally to storage subsystems, such as solid state disks (SSDs) and particularly to performance of the SSDs.

SSDs have shown promise in cloud storage and other types of large storage applications in the recent decade with increased anticipation of more to come. For example, an entire standard, currently employed by SSDs, i.e. PCI Express (PCIe), has been developed.

Currently, SSDs are nearly dumb storage devices with no capability of complex data manipulation, which is essentially done by external processors or microcontrollers. The act of retrieving and/or storing data in the SSDs causes a wait time before computation can be started. As can be appreciated, system performance is an essential advantage in large-scale storage applications servicing many users.

For example, current server architectures perform computation of data that is stored in a storage medium. Performing this computation entails moving data to and from main memory of the processor, such as a central processing unit (CPU), and the storage subsystem. Moving the data hinders system performance.

Furthermore, storage subsystems suffer from low performance.

Therefore, the need arises to increase the performance of systems employing storage subsystems, such as SSDs.

SUMMARY

Briefly, an embodiment of the invention includes a storage subsystem having a storage central processing unit (SCPU) operable to receive and send a command to a host, the command requiring data computation, a compute engine coupled to the SCPU, and a bank of memory devices coupled to the SCPU and the compute engine and configured to store data required by the commands, wherein the SCPU or the compute engine are operable to perform computation of the data and to further invoke an appropriate Flash Translation Layer (FTL) application based on workload.

A further understanding of the nature and the advantages of particular embodiments disclosed herein may be realized by reference of the remaining portions of the specification and the attached drawings.

DETAILED DESCRIPTION OF EMBODIMENTS

Figure 1:
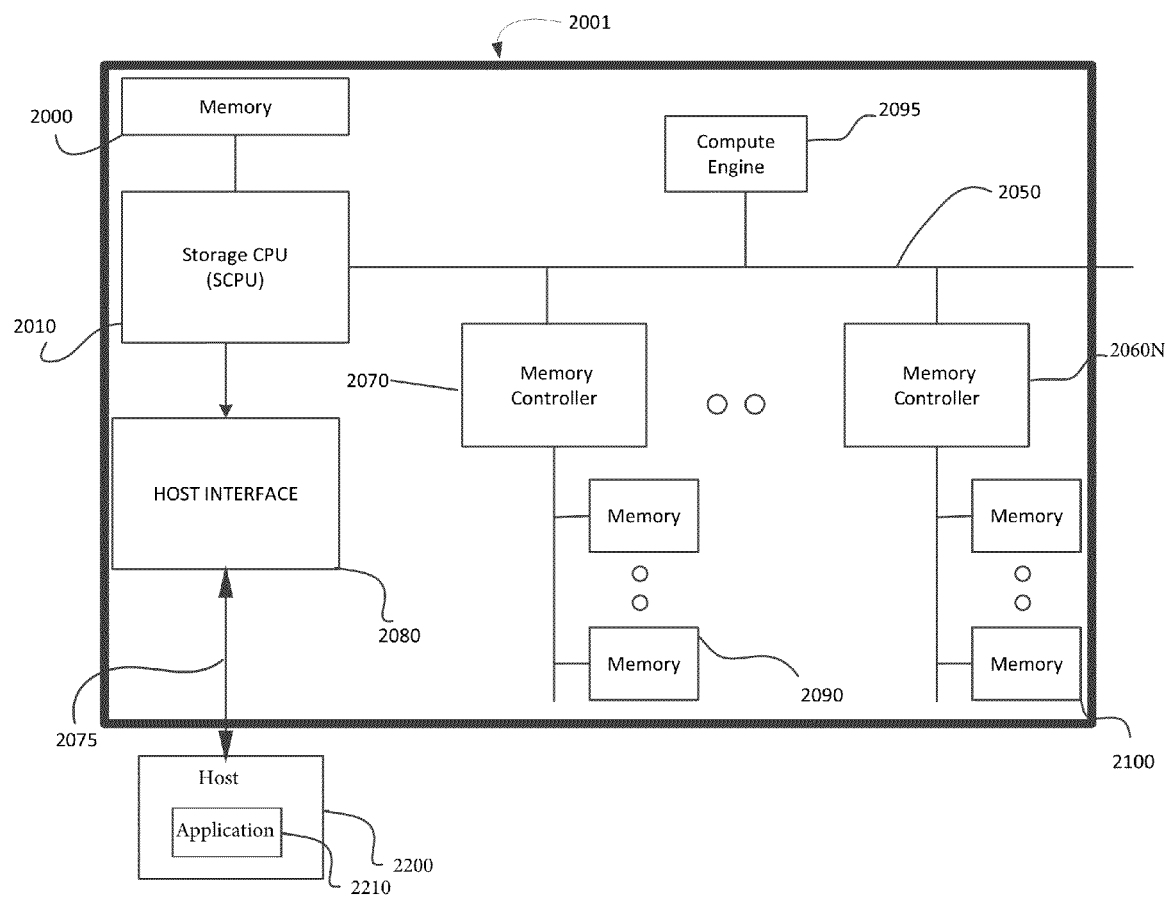
FIG. 1 shows a storage subsystem, in accordance with an embodiment of the invention.

Referring now to FIG. 1, a storage subsystem 2001 is shown, in accordance with an embodiment of the invention. The storage subsystem 2001 is shown to include memory 2000, storage central processing unit (SCPU) 2010, host interface 2080, a bank of memory controllers 2070-2060N, a bank of memory devices 2090, an interface 2050, compute engine 2095, a host interface bus 2075, and a bank of memory devices 2100. The storage subsystem 2001 is shown coupled to a host 2200, which is shown to include an application 2210. The host 2200 is shown coupled to the host interface 2080 of the storage subsystem 2001 through the host interface bus 2075.

In some embodiments, each of the memory devices 2090 and 2100 is made of volatile memory or a combination of volatile and non-volatile memory.

The SCPU 2010 is shown coupled to the memory 2000 and the host interface 2080. The SCPU 2010 is further shown to be in communication with the memory controllers 2070-2060N and the compute engine 2095 through the interface 2050. Similarly, the compute engine 2095 and the memory controllers 2070-2060N are in communication with each other through the interface 2050. The host interface 2080 is in communication with a host 2200 through the host interface bus 2075. The memory controller 2070 is shown coupled to the bank of memory devices 2090 and the memory controller 2060N is shown coupled to the bank of memories 2100. While not shown, there is typically more than two memory controllers and associated bank of memories than that which is shown in FIG. 1. In some embodiments, the bank of memory devices 2090 and 2100 are non-volatile memory. The storage subsystem 2001 comprises a SSD with the compute engine 2095 embedded in the SSD. The storage subsystem 2001 need not be a SSD and in some embodiments, it is other types of systems or sub-systems, such as without limitation, servers. The storage subsystem 2001 is not intended to be limited to a subsystem. For example, viewing the subsystem 2001 as a subsystem, it is an independent entity that is used by a system. In the case where the storage subsystem 2001 is viewed as a system, the subsystem 2001 is not used by another system and is rather plugged into the device it is designed for, such as a computer.

In exemplary embodiments of the invention, the interface 2050 is a processor local bus, such as without limitation, a PCI Express (PCIe) bus or a processor interconnect bus, such as a hypertransport, or QuickPath Interconnect (QPI). In exemplary embodiments of the invention, the host interface bus 2075 is PCIe, Ethernet, fiber channel, infiniband, or Serial ATA (SATA).

The storage subsystem 2001 performs computing by being closest to the data since the data is saved in the bank of memory devices 2090 and 2100. Only the interface 2050 separates the compute engine 2095 from the data. Accordingly, the storage subsystem 2001 exploits the close locality of data.

In operation, the host interface 2080 receives or sends commands from and to a host through the host interface bus 2075. Alternatively, events are received or sent by the host interface 2080 to a host through the host interface bus 2075.

The host interface 2080 transmits received host commands to the SCPU 2010 for processing. The SCPU 2010 uses the memory 2000 for temporary storage. For example, data associated with a host command may be stored in the memory 2000. Upon processing the host command, the SCPU 2010 instructs the compute engine 2095 and the memory controllers 2070-2060N accordingly. For instance, an application, such as the application 2210 (shown in FIG. 1) that is being executed by the host may require computations such as fast fourier transform (FFT) or search of the data, the data being either stored in the storage subsystem 2001 or being transmitted thereto. The compute engine 2095, under the direction of the SCPU 2010, performs such computation. The memory controller 2070, under the direction the SCPU 2010, stores or retrieves data to and from the bank of memory devices 2090 to which it is coupled. Similarly, the memory controller 2060N stores and/or retrieves data to and from the bank of memory devices 2100 to which it is coupled. Alternatively, the SCPU 2010, instead of the compute engine 2095, performs computations. In this manner and advantageously, compute functions as well as data storage are all done by the storage subsystem 2001 without the need for data movement to and from the host, which frees the host to tend to other matters thereby improving system performance. In other words, the host is offloaded. Reduction in system power as data is not moved from volatile memory across many interfaces to the host memory. Accordingly, the step(s) of having to move the data from the host to storage, i.e. the bank of memory devices 2090 and 2100, is avoided. This results in power saving. Furthermore, the storage subsystem 2001 causes lower latency compared to prior art systems because data movement across multiple interfaces is avoided. Data movement is merely across one interface, the interface 2050.

Figure 2:
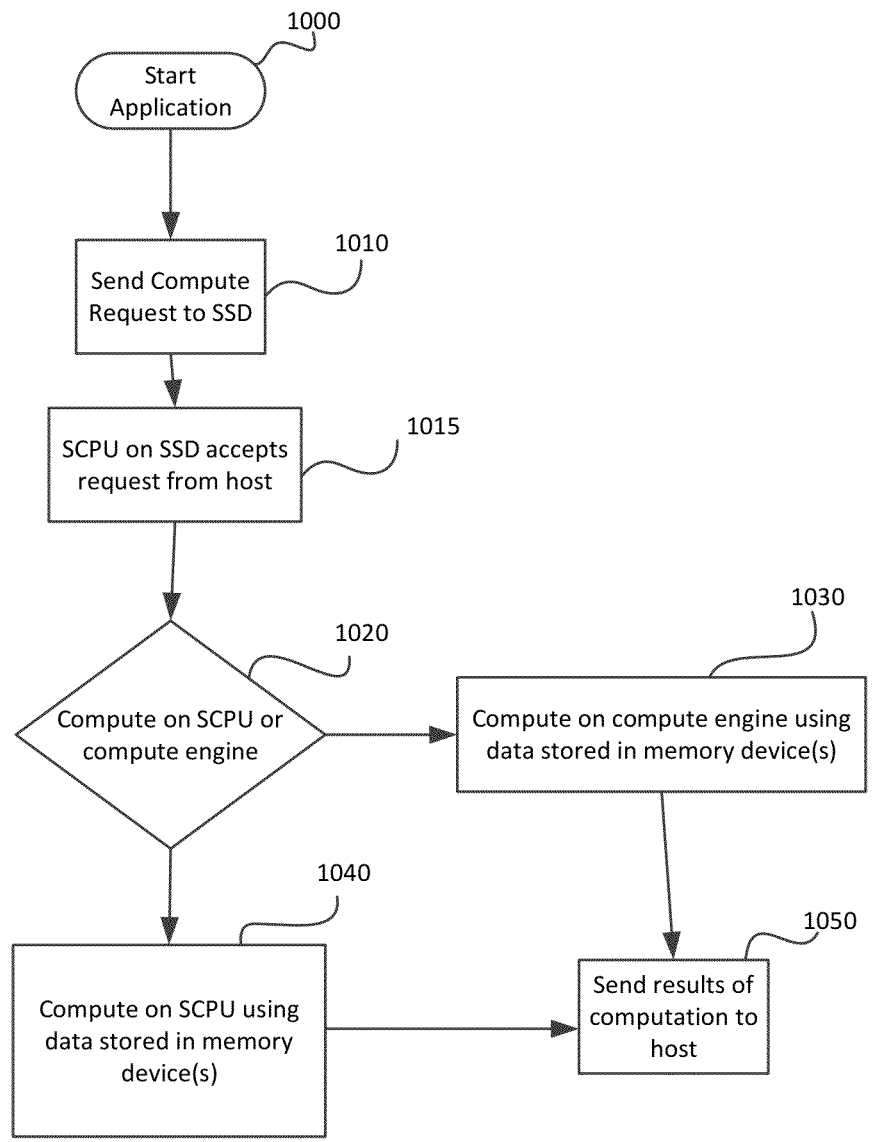
FIG. 2 shows an exemplary process performed by the storage subsystem of FIG. 1.

FIG. 2 shows an exemplary process performed by the storage subsystem 2001 of FIG. 1. At 1000, in FIG. 2, an application, such as the application 2210 of FIG. 1, requiring data computation, is begun by the host. The host determines if the data computation can be offloaded to the SSD. If the data computation can be offloaded, the host will send the compute request to the SSD at step 1010. This can be accomplished by invoking appropriate Application Programming Interface (API) that is used to communicate with the SSD. The API could describe the compute function and the data that is to be operated upon that resides in the SSD. Next, at step 1015, the SCPU 2010 accepts a request from the host through the host interface 2080. Next, at 1020, a determination is made by the SCPU 2010 as to whether the SCPU 2010 or the compute engine 2095 perform the computation. If the computation is determined to be performed by the compute engine 2095, the process proceeds to the step 1030. At the step 1030, the SPCU 2010 directs data movement from the memory devices 2090 or 2100, through the memory controllers 2070 or 2060N, to the compute engine 2095. The computation is performed by the compute engine 2095 using the data that is stored in the memory devices 2090 or 2100. Next, at step 1050, results of the computation by the compute engine 2095 are sent to the host through the SCPU 2010 and the host interface 2080. Otherwise, if at 1020, it is determined that the SCPU 2010 is to perform the computation, the process continues to the step 1040 where the SPCU 2010 directs data movement from the memory devices 2090 or 2100, through the memory controllers 2070 or 2060N to the memory 2001 and performs the computation using the data stored in the memory devices 2090 or 2100 and step 1050 is consummated.

In this respect, the storage subsystem 2001 allows performing computation within a SSD, avoiding data movement of data that is stored in the SSD to the host for computation, performing the compute function in the compute engine 2095 or the SCPU 2010, and reducing latency of applications because data is not moved from memory devices 2090 or 2100 across many interfaces to the host.

A method and apparatus, in accordance with an apparatus and method of the invention, for communicating with a Solid State Disk (SSD) that increases application throughput in a computer system is disclosed.

The embodiments presented herein represent apparatus and methods of the invention to improve the performance of applications running on computer systems that use one or more solid-state disks (SSDs).

SSDs comprise:
    A host interface that is coupled to the computer system
    One or more volatile or non-volatile memory devices.
    Embedded central processing unit (CPU) for translation of host logical address map to physical addresses of the volatile memory or non-volatile memory and housekeeping associated with managing and interfacing to the host CPU.

Various housekeeping activities to manage the memory in the SSD

Figure 3:
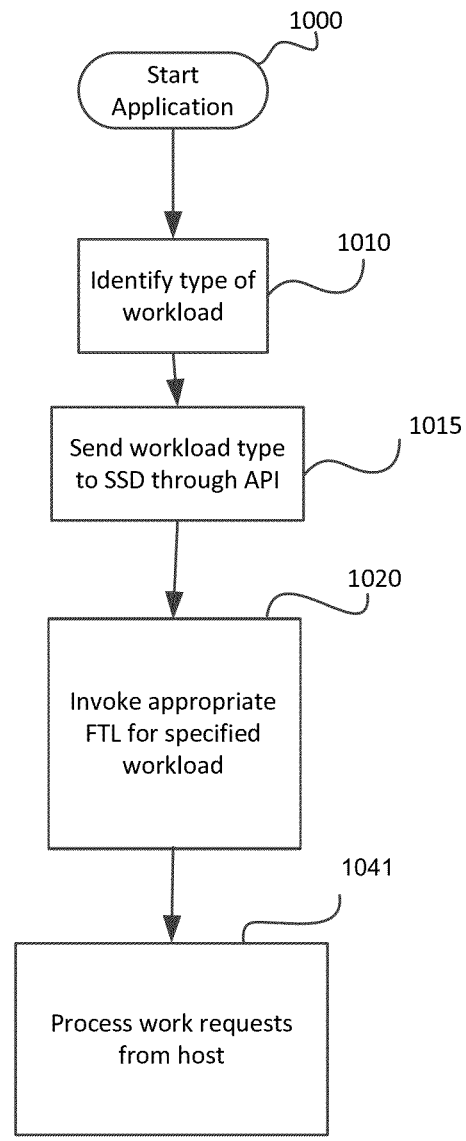
FIG. 3 shows an exemplary process performed by the storage subsystem of FIG. 1, for invoking an appropriate Flash Translation Layer (FTL) application for the target workload.

FIG. 3 shows an exemplary process for provisioning an optimal firmware to run on the storage subsystem 2001, for a specific workload, performed by the storage subsystem 2001 of FIG. 1. At 1000, an application running on the host and requiring access to the storage subsystem of 2001, is started. At step 1010, execution of the application by the storage subsystem 2001 causes determining, by the SCPU 2010, the type of workload for accessing the storage subsystem. The workload can be, but is not limited to, any variation of read and write accesses.

Next at step 1015, execution of the application causes the SCPU to send the workload information through appropriate APIs. At step 1020 upon receipt of the APIs, the storage subsystem 2001 configures and/or launches ("invokes") the appropriate Flash Translation Layer (FTL) application that is optimized for the workload sent by execution of the application. In the case of other non-volatile memories, similar logical-to-physical translation layers software is invoked. At step 1041, the storage subsystem 2001 is ready to process work requests associated with the workload from the host. In an embodiment of the invention, the FTL application is run by the SCPU 10.

Figure 4:
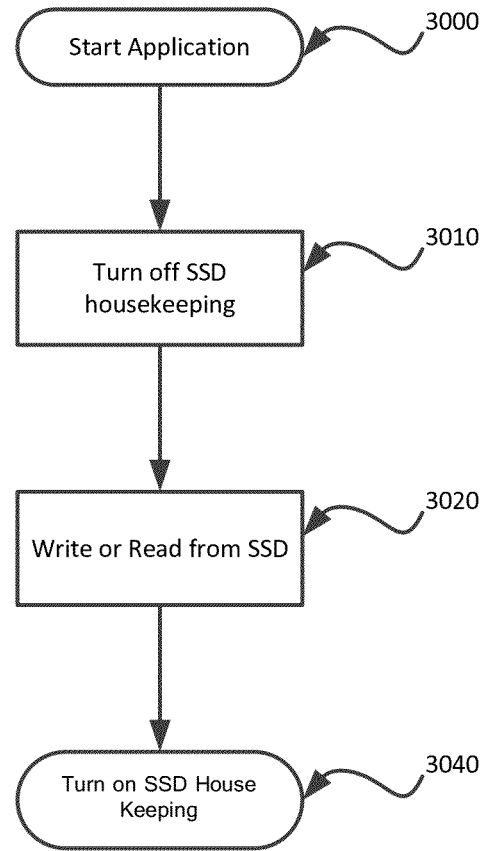
FIG. 4 shows an exemplary process performed by the storage subsystem of FIG. 1, for controlling the housekeeping functions of the SSD.

FIG. 4 shows an exemplary process performed for dynamically turning 'on' or 'off' housekeeping operations, by the storage subsystem 2001 of FIG. 1. At 3000, an application running on the host and requiring access to the storage subsystem of 2001 is started. Next at step 3010, in embodiments employing one or more SSDs in the storage subsystem 2001, through execution of the application that is running on the host, it is decided by the SCPU 2010 that the host wants maximal access to the SSD and therefore sends instructions using the APIs to the SSD to turn off housekeeping. The SSD through the SCPU, upon receipt of the instructions from host (i.e. host 2200 shown in FIG. 1) through the APIs, suspends its housekeeping operation. Optionally, the host using these APIs can advise the SSD to inform about the duration of the suspension of the housekeeping operations. Next at step 3020, execution of the application causes accesses to the SSD for read and/or writes operation. At step 3040, upon execution of the application, a decision is made by the SCPU that the host does not need maximal access to the SSD and therefore informs the SSD to turn 'on' housekeeping through APIs. Upon receipt of these instructions through these APIs, the SSD starts the housekeeping operation if it is deemed necessary.

The APIs can also be used to select optimal algorithms to manage the memory, i.e. memory banks 2090 and 2100, based on the workload.

According to the various methods and apparatus of the invention, predictable performance, increased endurance, reduced latency, dynamic ability to turn on/off housekeeping, select optimal SSD algorithms through APIs, and scheduling SSD housekeeping at optimal times based on dynamic work load API calls may be achieved.

Although the description has been described with respect to particular embodiments thereof, these particular embodiments are merely illustrative, and not restrictive.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What we claim is:

1. A method of managing work requests by a solid state disk (SSD) from a host comprising:
   receiving a command and accompanying data from a host through an interface, the host being located externally to the SSD, by a storage central processing unit (SCPU), the command requiring transformation of the data;
   storing the data to be transformed in a bank of memory devices coupled to the SCPU;
   determining a single compute engine, coupled to the SCPU and the bank of memory devices, is to perform transformation of the data, the single compute engine being separated from the stored data in the bank of memory devices only by the interface;
   upon the determination, the single compute engine being operable to perform transformation of the stored data entirely within the SSD by exploiting the close locality of the data being transformed to the single compute engine, before the transformed data is sent to the host and to avoid the need for data movement to and from the host during the transformation;
   receiving an identified type of workload from a host by the SSD;
   invoking an appropriate Flash Translation Layer (FTL) application for a workload of the identified type of workload; and
   processing work requests associated with the workload from the host.

2. The method of managing of claim 1, wherein the invoking step is performed though an Application Programming Interface (API).

3. The method of managing data, as recited in claim 2, further including deciding, by the SCPU, the host wanting maximal access to the storage subsystem and sending instructions using the API to turn off housekeeping.

4. The method of managing data, as recited in claim 1, further including employing one or more solid state disks (SSDs) in the storage subsystem through execution of an application being executed by the host.

5. A storage subsystem comprising:
   a storage central processing unit (SCPU) operable to receive from and send commands to a host, located externally to the storage subsystem, the SCPU responsive to a command requiring data transformation;
   a single compute engine coupled to the SCPU; and
   a bank of memory devices coupled to the SCPU and the single compute engine, through an interface, the bank of memory devices configured to store data associated with the command, the single compute engine being separated from the stored data in the bank of memory devices only by the interface, the single compute engine operable to transform the stored data entirely within the SSD by exploiting the close locality of the data being transformed before the transformed data is sent to the host and to avoid the need for any data movement to and from the host during the transformation, wherein upon receipt of an identified type of workload from a host the SCPU being operable to,
      invoking an appropriate Flash Translation Layer (FTL) application for a workload of the identified type of workload,
      processing work requests associated with the workload from the host.

6. The storage subsystem, as recited in claim 5, further including a memory coupled to the SCPU configured to store the data received from the host when the single compute engine is to perform the transformation.

7. The storage subsystem, as recited in claim 5, further including a host interface coupled to the SCPU and operable to receive from and send commands to the host.

8. The storage subsystem, as recited in claim 7, wherein the SSD is operable to avoid moving additional data received from the host, by the host interface, to the bank of memory devices during the transformation thereby reducing power consumption.

9. The storage subsystem, as recited in claim 5, wherein the memory devices of the bank of memory devices are non-volatile memory.

10. The storage subsystem, as recited in claim 5, wherein the memory devices of the bank of memory devices are volatile memory.

11. The storage subsystem, as recited in claim 5, further including a memory controller coupled to the bank of memory devices and operable to control the bank of memory devices.

12. The storage subsystem, as recited in claim 5, wherein the storage subsystem causes reduced latency by avoiding movement of the data across multiple interfaces.

13. The storage subsystem, as recited in claim 5, wherein the transformation is fast fourier transform (FFT).

14. The storage subsystem, as recited in claim 5, wherein the storage subsystem is a server.

15. The storage subsystem, as recited in claim 5, wherein the interface is a PCI Express (PCIe) bus or a processor interconnect bus.

16. The storage subsystem, as recited in claim 15, wherein the host interface bus is PCI Express (PCIe), Ethernet, fiber channel, infiniband, or Serial ATA (SATA).

17. The storage subsystem, as recited in claim 5, wherein the host interface is coupled to the host through a host interface bus.

18. The storage subsystem, as recited in claim 5, wherein the SCPU is operable to determine whether the SCPU or the single compute engine perform the transformation of the data.

19. The storage subsystem, as recited in claim 5, further including a memory coupled to the SCPU and configured to store the data when the SCPU or the single compute engine is to transform the data.

20. The storage subsystem, as recited in claim 5, wherein the storage subsystem is a solid state disk (SSD).

* * * * *